United States Patent [19]
Miles

[11] 4,167,934
[45] Sep. 18, 1979

[54] METHOD AND APPARATUS FOR INHIBITING ABSORPTION OF SOLAR ENERGY

[75] Inventor: Alfred Miles, Hood River, Oreg.

[73] Assignee: Portco Corporation, Vancouver, Wash.

[21] Appl. No.: 859,016

[22] Filed: Dec. 9, 1977

[51] Int. Cl.² .................................................. F24J 3/02
[52] U.S. Cl. .................................................. 126/422
[58] Field of Search ............................... 126/270, 271

[56] References Cited
U.S. PATENT DOCUMENTS

| | | | |
|---|---|---|---|
| 2,553,302 | 5/1951 | Cornwall | 126/271 |
| 3,620,206 | 11/1971 | Harris et al. | 126/271 |
| 4,083,356 | 4/1978 | Rajagopal | 126/271 |

*Primary Examiner*—John J. Camby
*Attorney, Agent, or Firm*—Kolisch, Hartwell, Dickinson & Stuart

[57] ABSTRACT

In solar collecting apparatus including heat transfer conduits for circulating fluid, a regulating device is provided for controlling conduit temperature. The regulating device includes a barrier which is operable for selectively presenting a fluid layer or shield in front of the conduits to inhibit absorption of the conduits of solar energy. The conduits are thereby effectively prevented from rising above a predetermined temperature.

6 Claims, 2 Drawing Figures

METHOD AND APPARATUS FOR INHIBITING ABSORPTION OF SOLAR ENERGY

BACKGROUND AND SUMMARY OF THE INVENTION

The present invention relates to solar energy collecting apparatus of the type including fluid circulating conduits which are exposed to the sun. More particularly, the present invention is directed to a novel method and apparatus for presenting a barrier or screen in the form of a fluid layer between the conduits and the sun to prevent the conduits from rising above a predetermined temperature.

Generally, known solar energy collecting apparatus include a bank of fluid circulating conduits which are supported in some type of mounting on a home or building. The mounting may be directed at predetermined angles relative to the sun and the conduits transport heated fluid to end uses in the home or building. A problem present with known apparatus resides in the fact that the fluid circulating conduits are generally constructed of metallic materials such as copper or copper alloys. Such materials are generally satisfactory from a heat transfer standpoint, but are relatively heavy and in large collecting apparatus result in substantial fabrication and installation costs.

It has been proposed to utilize synthetic materials for the fluid circulating conduits and coat them with black or dark material in order to increase their absorption capability. However, during warm periods such as the summer, a collecting apparatus may be shut down. Fluid may not be circulated through the conduits during such a period and the conduits can become quite hot. In the case where plastic or synthetic materials are used in the conduit construction, too much solar energy may be absorbed. The result is that the conduits will become softened and damaged. If no provision is made to limit absorption of solar energy by the exposed conduits, they may melt.

Materials such as polyvinylchloride (PVC) may become softened at around 160° F. Temperatures in this range may readily occur on rooftops of homes or buildings during the summer. In order to provide an effective solar energy collecting apparatus utilizing plastic materials in the fluid circulating conduits, it is necessary to somehow limit or control the penetration of the sun's rays onto the conduits during down times.

Accordingly, it is a general object of the present invention to provide a solar intercept or fluid barrier which is automatically operable for presenting a fluid layer between the sun's rays and the fluid circulating conduits so that the conduits are inhibited from absorbing solar energy. This object is accomplished by providing spaced-apart cover plates over the conduits between the conduits and the sun's rays. The spaced-apart cover plates define an enclosed compartment which is adapted for receiving a fluid. When the compartment is filled with the fluid, the sun's rays are effectively intercepted and reflected so that they are not absorbed by the conduits.

Another object of the present invention is to provide an enclosed compartment as described above which communicates with a fluid reservoir. A control device is operatively connected to a temperature sensor which senses conduit temperature. Upon conduit temperature reaching a predetermined level, the control device opens a valve interposed between the reservoir and the compartment for permitting fluid under pressure, as by gravity or induced pressure, to fill the compartment and shield the conduits from absorbing further solar energy.

Still another object of the present invention is to provide a fluid barrier in which the control device is also operatively connected to a pump for extracting fluid from the compartment upon conduit temperature being lowered to a second predetermined temperature which is lower than the first predetermined temperature. The pump delivers fluid from the compartment back to the reservoir.

A further object of the present invention is to provide an arrangement whereby the operation of the control and transfer of the fluid from the reservoir to the compartment is automatically accomplished without requiring an external motivating mechanism.

DETAILED DESCRIPTION OF THE PREFERRED EMBODIMENT

Figure 2:
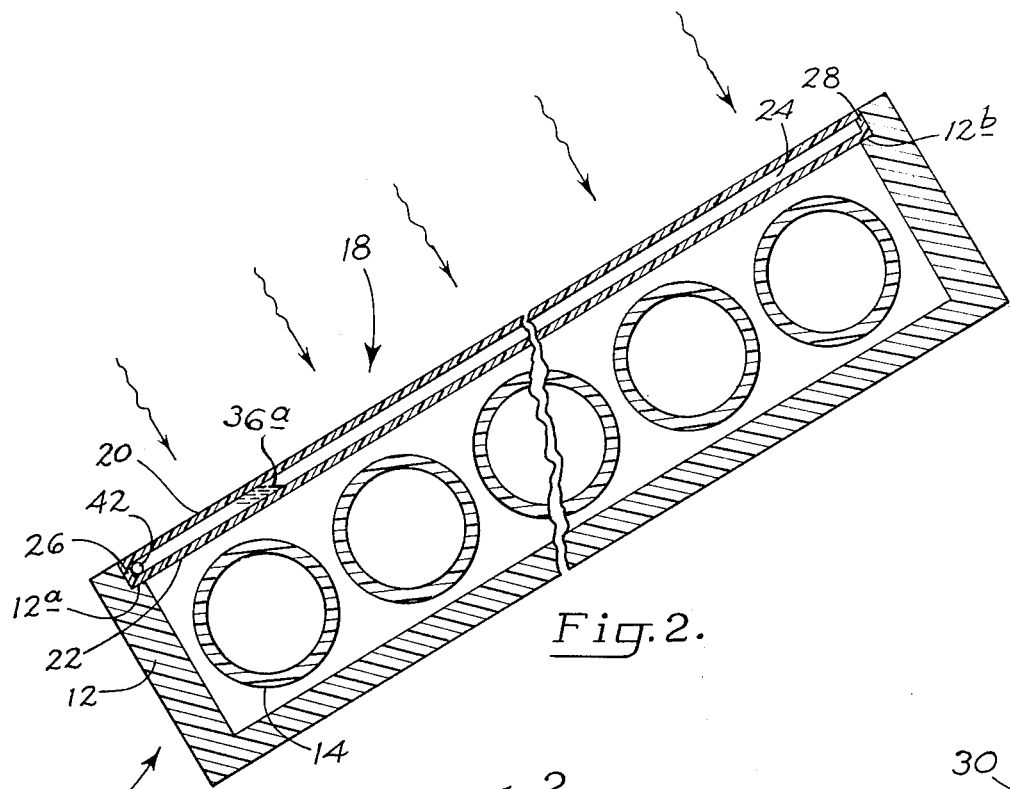
FIG. 2 is a cross sectional view taken along lines 2—2 of FIG. 1 and illustrates the positioning of a fluid receiving compartment between the sun's rays and the fluid circulating conduits.
Figure 1:
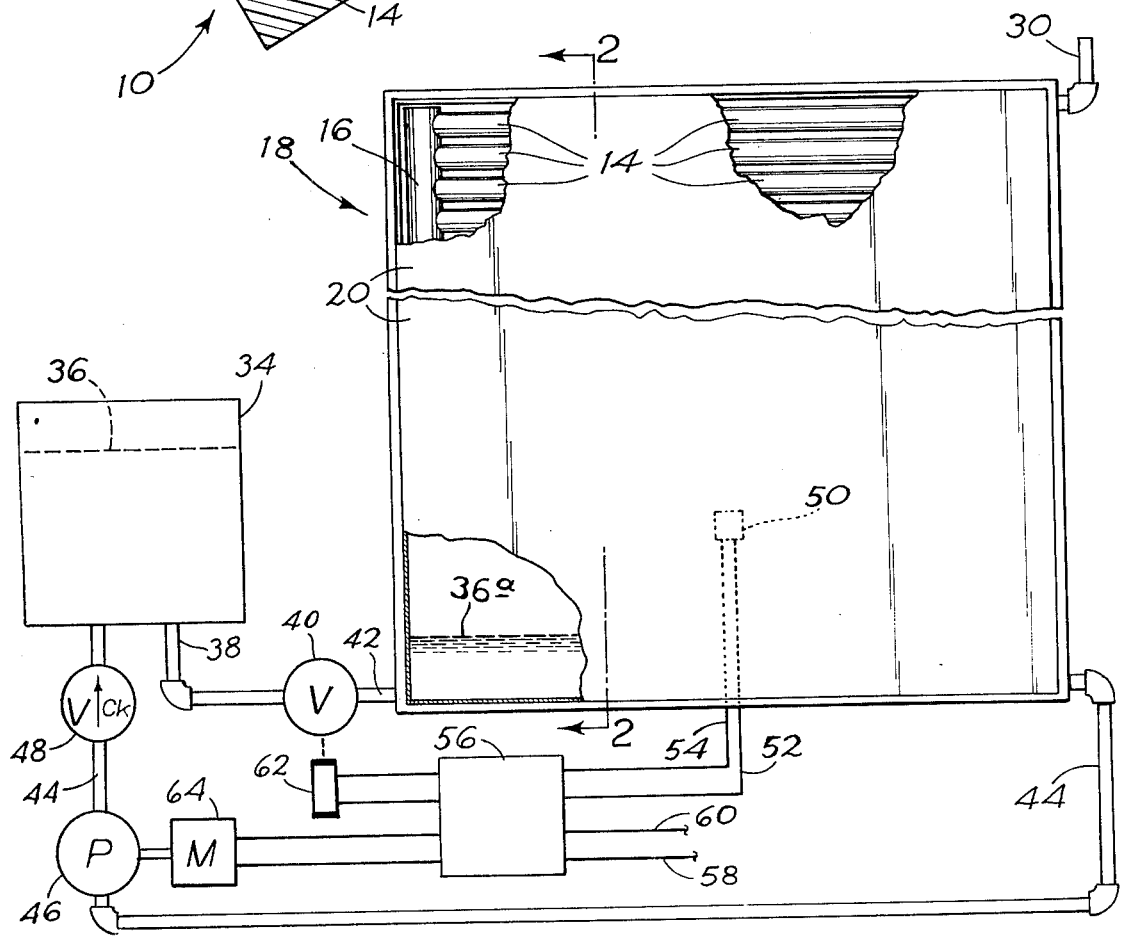
FIG. 1 is a general schematic view of an apparatus for presenting a fluid barrier positioned in front of fluid circulating conduits of a solar energy collecting apparatus.

Turning now to the drawings, and referring to FIGS. 1 and 2, there is indicated generally at 10 portions of a solar energy collecting apparatus including an insulating container 12 and a plurality of fluid circulating conduits 14. As shown in FIG. 1, the conduits are interconnected adjacent their opposite ends by suitable headers such as header 16. The headers are provided for admitting and discharging liquid circulated therethrough whereby heat is transferred from conduits 14 to the liquid by solar energy.

Conventionally, conduits 14 are arranged in insulating container 12 so that they are presented at a southern exposure toward the sun at at a preselected angle. While not illustrated, insulating container 12 is appropriately secured to a mounting on a roof or side of a building or home. The heated liquid may be used for conventional purposes such as hot water heating, furnace heating, etc.

As mentioned previously, it is desirable to construct conduits 14 of synthetic or plastic materials for the savings in material costs and fabrication. The present invention finds particular utility when such conduits are used. According to the present invention, a regulating means for controlling conduit temperature includes a barrier means, generally indicated at 18, disposed in front of conduits 14. Barrier means 18 includes spaced-apart transparent cover plates 20, 22 which define an enclosed compartment 24 adapted for receiving a fluid such as liquid. The bottom and top edges of cover plates 20, 22 are sealed by walls 26, 28, respectively. While not illustrated in FIG. 2, side walls are also provided for sealing compartment 24.

As shown in FIG. 2, continuously extending notches or support ledges 12a, 12b are provided for seating barrier means 18 in position above conduits 14. At an upper end of barrier means 18 (as shown in FIG. 1) there is provided an air vent 30 which communicates with compartment 24.

Considering FIG. 1 in further detail, it can be seen that there is provided a reservoir means 34 adjacent barrier means 18 for holding a suitable intercepting or reflecting fluid such as a liquid indicated at 36. It is contemplated that reservoir means 34 will be pressurized and sized with a volume for containing enough liquid to completely fill the cavity of compartment 24. Extending from reservoir means 34 is a conduit such as pipe 38 which is suitably connected to the inlet of a valve means 40. The outlet of valve means 40 extends to a lower portion of barrier means 18 and serves as an inlet 42 extending into compartment 24.

Viewing the right side of FIG. 1, it can be seen that an outlet conduit such as pipe 44 extends from compartment 24 and provides a return to reservoir means 34. Pipe 44 extends into an inlet of a pump means 46 which is operable for pumping fluid from compartment 24 through a check valve 48 back into reservoir means 34.

A temperature sensing means such as sensor 50 is suitably connected to conduits 14 for detecting conduit temperature or an average conduit temperature. Sensor 50 is interconnected by leads 52, 54 to a control means 56. Control means 56 is connected to a suitable power source (not shown) by leads 58, 60 and includes suitable actuating mechanism for automatically controlling the opening and closing of valve means 40 such as a solenoid 62. Control means 56 is also operatively connected to motor 64 which is operable for driving pump means 46.

Operation of the regulating means for controlling conduit temperature according to the present invention will now be described. Initially, assume that compartment 24 is evacuated and only an air space is provided between cover plates 20, 22. In this condition, reservoir means 34 will be filled with fluid, such as liquid 36 and valve means 40 will be closed. Pump means 46 will be inoperative and the sun's rays will pass through cover places 20, 22 due to their transparency, for impinging upon conduits 14. Conduits 14 will absorb solar energy from the sun's rays and transfer the energy in the form of heat to fluid being circulated through the conduits.

During periods of relatively warm ambient temperatures, fluid may not be circulated through conduits 14 because of a lack of user demand. However, the sun's rays will still impinge upon the conduits and cause them to gain heat. With no fluid being circulated through the tubes, it is apparent that there is no medium to which the heat may be transferred from the conduits. Assuming that the conduits are constructed of synthetic or plastic material, it will be known at which temperature they will start to melt or become softened. For instance, PVC conduits will become somewhat softened at about 160° F. Thus, it would be desirable to prevent PVC conduits from becoming heated above a predetermined temperature of say 130° F. This predetermined temperature will be sensed by sensor 50 and will be communicated to control means 56. Control means 56 will then actuate solenoid 62 for opening valve means 40.

Liquid under pressure will then pass through valve means 40 from reservoir means 34 into compartment 24 via inlet 42. The liquid will rapidly fill compartment 24. As shown in FIGS. 1 and 2, compartment 24 is being filled with liquid which has only reached the level indicated at 36a. Thus, it can be seen that a barrier means will be presenting a fluid layer or shield which inhibits absorption by the conduits of solar energy so that the conduits are not heated above a predetermined temperature.

When the conduit temperature decreases to a second, lower predetermined temperature sensed by sensor 50, control means 56 will actuate solenoid 62 so that valve means 40 is closed. Control means 56 will actuate motor 64 so that it will operate pump means 46. Fluid within compartment 24 will be pumped through conduit 44 and withdrawn from the compartment for return to reservoir means 34. Thus, it can be appreciated that the regulating means will automatically control the temperature of conduits 14 to prevent the conduits from rising above a predetermined temperature.

The temperature regulating means of the present invention provides several distinct advantages. First of all, barrier means 18 is simply constructed requiring only a pair of spaced-apart transparent cover plates which are sealed at their side and ends to define a fluid accommodating compartment 24. With fluid disposed in compartment 24, it can be appreciated that the sun's rays will be effectively inhibited from being transmitted to the collecting conduits for absorption thereby. The fluid or liquid layer may include additional matter for increasing the fluid's reflective characteristics. For instance, reflective material may be provided in the form of beads or granules in a liquid.

Another advantage of the present invention resides in the arrangement of reservoir means 34 for discharging liquid through valve means 40 for rapidly and completely filling compartment 24. Also, pump means 46, being operatively connected to control means 56, will quickly and efficiently return liquid from compartment 24 into reservoir means 34 after sensor 50 determines that the conduit temperatures have arrived at a second, lower predetermined temperature. Reservoir means 34 may be positioned above compartment 24 so that the liquid will flow by gravity. Alternatively, it may be advantageous to pressurize the reservoir means so that upon automatic actuation of valve means 40, liquid will be forced into compartment 24.

Further advantages of the present invention reside in the fact that no complicated mechanical or electrical construction is required to effectively shield or cover collecting conduits 14. The quick transference of fluid or liquid into compartment 24 provides a novel and effective barrier means.

While the invention has been particularly shown and described with reference to the foregoing preferred embodiment, it will be understood by those skilled in the art that other changes in form and detail may be made therein without departing from the spirit and scope of the invention as defined in the appended claims.

It is claimed and desired to be secured by letters patent:

1. In solar collecting apparatus including heat transfer conduits for circulating a reflective fluid, regulating means for controlling conduit temperature comprising:

barrier means including a pair of spaced-apart transparent cover plates positioned above the heat transfer conduits defining a normally vacant compartment adapted for receiving a fluid;

reservoir means connected to said compartment;

valve means interposed between said reservoir means and said compartment;

sensing means operable for detecting conduit temperature; and control means operatively connected to said valve means and said sensing means for actuating said valve means, upon the conduits reaching a predetermined temperature, for permitting introduction of fluid from said reservoir means and through said valve means into said compartment so that a fluid shield may be presented in front of the conduits to inhibit absorption by the conduits of solar energy.

2. The apparatus of claim 1 further including return conduit means and pumping means, said return conduit means interconnecting said compartment and said reservoir means, said pumping means being connected to said control means and operable for actuation by said control means for returning fluid from said compartment to said reservoir means.

3. The apparatus of claim 2 wherein said reservoir means holds fluid under pressure.

4. A method for controlling temperature in solar collecting apparatus having a pair of spaced-apart transparent cover plates defining a normally vacant compartment disposed above heat transfer conduits comprising:

sensing conduit temperature; and presenting a barrier by introducing a fluid into the compartment so that the fluid is disposed between the sun's rays and the conduits prior to the conduits rising above a first predetermined temperature.

5. The method of claim 4 further including the step of:

withdrawing the fluid layer after said presenting step when the conduit temperature reaches a second lower predetermined temperature.

6. The method of claim 4 wherein said presenting step is accompanied by deflecting of the sun's rays to inhibit absorption by the conduits of solar energy.

* * * * *